J. W. RIDDELL.
IMPLEMENT SOCKET FASTENING.
APPLICATION FILED FEB. 17, 1914. RENEWED MAR. 16, 1915.
1,139,724.
Patented May 18, 1915.
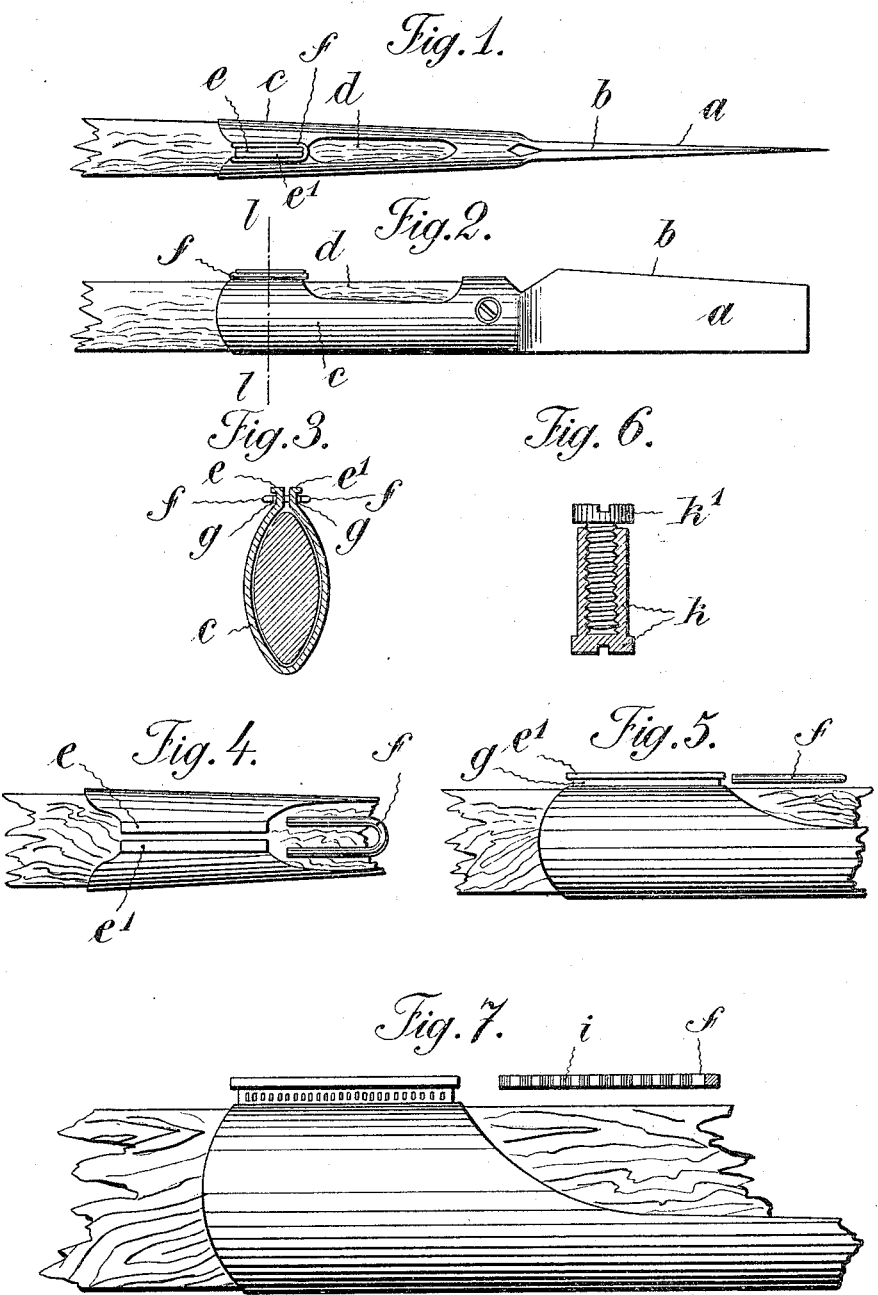
Witnesses
Inventor
John W. Riddell
By
Henry T. Bright
Attorney

UNITED STATES PATENT OFFICE.

JOHN WALTER RIDDELL, OF FELTON, ENGLAND.

IMPLEMENT-SOCKET FASTENING.

1,139,724.           Specification of Letters Patent.     Patented May 18, 1915.

Application filed February 17, 1914, Serial No. 819,180. Renewed March 16, 1915. Serial No. 14,772.

*To all whom it may concern:*

Be it known that I, JOHN WALTER RIDDELL, farmer, a subject of the King of Great Britain, residing at High Moor, Felton, in the county of Northumberland, England, have invented a new and useful Implement-Socket Fastening; and I do hereby declare the following to be a full, clear, and exact description of the invention, such as will enable others skilled in the art to which it appertains to make and use the same.

This invention relates to split sockets for securing agricultural and other implements to their helves or handles such as those having their divided edges formed with projecting ribs and clamped to the helve or handle by means of a key or clamp of any suitable form made with a dovetail recess engaging said projecting ribs.

My present invention comprises a particular form of the clamping or clipping member. This I make approximately U shaped to engage with and be forced along the side grooves in the said projecting ribs thereby bracing together the adjacent edges of the socket and firmly fixing the implement to its helve or handle. The socket, at the bottom, is bored with a hole through which is driven a nail or rivet to insure the implement being firmly fixed to its helve or handle.

The invention is applicable to various kinds of socketed agricultural implements but is illustrated in the accompanying drawings as applied to a hedge-cutter.

In the drawings, Figure 1 is a plan with blade edgewise. Fig. 2 is a side elevation and Fig. 3 a cross section through the line 1—1 Fig. 2 of a hedge-cutter whose socket is secured to its helve or handle in accordance with this invention. Figs. 4 and 5 are views of the implement and the clip shown detached. Fig. 6 is a detail view of a tubular pin and screw shown in section, for more firmly fixing the socket to the handle. Fig. 7 shows a modification in which the ribs and the inner side edges of the metal clip are formed with teeth or serrations to engage with each other.

$a$ is the blade of the hedge-cutter, $b$ the edge of the blade, $c$ its socket which is divided longitudinally and is scalloped at $d$ for lightness as shown.

Along the adjacent divided edges of the top portion of the socket are provided the ribs $e$ $e'$ by outwardly and laterally bending the metal to form side grooves $g$ $g'$ for the passage of the U shaped clipping member $f$ or other suitable fastening device which when forced along the side groove $g$ $g'$ firmly brace or bind these parts together and prevent the handle from becoming detached. The U shaped clipping member is preferably constructed of tempered rod steel so as to securely grip the side grooves $g$ $g'$ and may be formed with inturned ends $h$ to close over the ends of the ribs $e$ $e'$.

Further security is afforded by a rivet or nail $j$ which is driven through a hole formed in the lower part of the socket $c$ and through the shaft or handle. Instead of a rivet or nail a tubular pin may be employed as shown in Fig. 6 which is provided with a cross cut head $k$ and an internal screw thread at its opposite end into which is screwed a small screw $k'$. By this means together with the clip arrangement at the other end of the socket a new shaft can be readily fixed without in the least damaging the socket.

In the modification shown in Fig. 7 the ribs $e$ $e'$ and the inner side edges of the clipping member $f$ are formed with teeth or serrations $i$ which interlock and prevent the possibility of the clip leaving its place without the application of considerable pressure.

What I do claim as my invention and desire to secure by Letters Patent is:—

1. An implement socket having a divided portion, ribs extending contiguous with the edges of the division respectively, and a U-shaped clamping member embracing said ribs.

2. An implement socket having a divided portion, ribs extending contiguous with the edges of the division respectively, a U-shaped clamping member embracing said ribs, and coöperating teeth on the abutting faces of the ribs and clamping member.

In testimony whereof I have signed my name to this specification in the presence of two subscribing witnesses.

JOHN WALTER RIDDELL.

Witnesses:
    HENRY MAXION WILSON,
    A. MITCHINSON.

Copies of this patent may be obtained for five cents each, by addressing the "Commissioner of Patents, Washington, D. C."